United States Patent [19]

Takahashi

[11] Patent Number: 5,566,428
[45] Date of Patent: Oct. 22, 1996

[54] MOLDED SYNTHETIC RESIN BELT CONNECTING DEVICE AND METHOD OF PRODUCING THE SAME

[75] Inventor: Yoshinobu Takahashi, Toyama-ken, Japan

[73] Assignee: YKK Corporation, Tokyo, Japan

[21] Appl. No.: 374,044

[22] Filed: Jan. 18, 1995

[30] Foreign Application Priority Data

Jan. 20, 1994 [JP] Japan ................................. 6-031765

[51] Int. Cl.⁶ .................................................. A44B 13/00
[52] U.S. Cl. ...................................... 24/265 H; 24/265 R
[58] Field of Search ............................ 24/265 R, 265 A, 24/265 BC, 265 EC, 265 H, 265 CD, 265 EE

[56] References Cited

U.S. PATENT DOCUMENTS

| 3,995,822 | 12/1976 | Einhorn et al. . | |
|---|---|---|---|
| 4,680,837 | 7/1987 | Rubinstein . | |
| 5,146,657 | 9/1992 | Frano .................................... | 24/265 H |
| 5,148,582 | 9/1992 | Dennis, Jr. . | |
| 5,274,887 | 1/1994 | Fudaki . | |

FOREIGN PATENT DOCUMENTS

| 0099577 | 2/1984 | European Pat. Off. . |
|---|---|---|
| 0159614 | 10/1985 | European Pat. Off. . |

*Primary Examiner*—James R. Brittain
*Attorney, Agent, or Firm*—Hill, Steadman & Simpson

[57] ABSTRACT

The invention provides a molded synthetic resin belt connecting device of the type including a belt attachment member and a fastening member rotatably connected together, wherein a headed pin formed integrally with a rotatable shaft of the belt attachment member and a socket formed integrally with the fastening member are assembled together to form a swivel joint such that a head portion of the headed pin is loosely received in a through-hole in the socket, and a neck portion of the headed pin which is smaller in diameter than the head portion is loosely received in a cutout groove at a junction between the cutout groove and the through-hole. The belt attachment member and the fastening member are molded of synthetic resin in an assembled condition by a single injection-molding run or cycle. The belt connecting device thus constructed is free from break at a joint portion between the belt attachment member and the fastening member and hence is highly durable in construction and labor-saving in assembly. A method of producing the molded synthetic resin belt connecting device is also disclosed.

11 Claims, 5 Drawing Sheets

1

MOLDED SYNTHETIC RESIN BELT CONNECTING DEVICE AND METHOD OF PRODUCING THE SAME

BACKGROUND OF THE INVENTION

1. Field of the Invention

The present invention relates to a molded synthetic-resin belt connecting device, such as a swivel hook, a buckle or the like strap fastener, used for bags, knapsacks and the like articles, and a method of producing the molded synthetic-resin belt connecting device.

2. Description of the Prior Art

One known molded synthetic-resin belt connecting device disclosed, for example, in Japanese Patent Publication No. 63-29124 comprises a swivel hook composed of a ring member and a hook member that are molded of synthetic resin in a separate condition and then are assembled together. The hook member has at its one end a split, radially contractible leg composed of a reduced neck portion and an enlarged head portion in the shape of a truncated cone. The split leg is pushed into an attachment hole formed in the ring member while it is radially contracted. When the head portion passes through the attachment hole, the contracted split leg resiliently expands radially outwardly to restore its original shape whereby the hook member and the ring member are rotatably coupled together, with the neck portion rotatably received in the attachment hole.

The disclosed swivel hook, however, has a drawback that since the head and neck portions of the hook member which are vertically split will be forcibly fitted in the attachment hole in the ring member, the neck portion is structurally weak and hence is liable to be damaged or broken during assembling operation, and is poor in durability. If an attempt were made to enlarge or thick the neck portion for a purpose of reinforcement, such an enlarged neck portion would hinder smooth snap-fit engagement between the vertically split leg of the hook member and the attachment hole in the ring member.

SUMMARY OF THE INVENTION

In view of the foregoing drawback of the prior art, it is an object of the present invention to provide a molded synthetic resin belt connecting device including a belt attaching member and a fastening member rotatably connected together via a swivel joint which is free from rupture or break, highly durable in construction and labor-saving in assembly.

Another object of the present invention is to provide a method of producing the molded synthetic-resin belt connecting device.

The present invention seeks to provide a molded synthetic resin belt connecting device which comprises a belt attachment member, and a fastening member rotatably connected with the belt attachment member via a swivel joint, the swivel joint including a headed pin formed integrally with one of the belt attachment member and the fastening member, and a socket formed integrally with the other of the belt attachment member and the fastening member and rotatable freely on the headed pin, wherein the belt attachment member and the fastening member are molded of synthetic resin in an assembled condition, with the headed pin freely rotatably received in the socket.

According to a preferred embodiment, the belt attachment member includes a rotatable shaft, the headed pin is integral with a central portion of the rotatable shaft and extending at right angles to a longitudinal axis of the rotatable shaft, the fastener member includes a base portion, and the socket is integral with the base portion of the fastening member. In another preferred embodiment, the belt attachment member includes a rotatable shaft, the socket vis integral with a central portion of the rotatable shaft, the fastener member includes a base portion, and the headed pin is integral with the base portion of the fastening member and extending at right angles to a longitudinal axis of the rotatable shaft.

Preferably, the headed pin includes a neck portion integral with the one of the belt attachment member and the fastening member, and a head portion having a diameter larger than that of the neck portion, and the socket has a through-hole extending in a first direction and loosely receiving therein the head portion, and a cutout groove loosely receiving the neck portion and extending in a second direction which is different from the first direction and intersects the through-hole. It is preferable that the first and second directions are perpendicular to one another.

Preferably, tile head portion is cutout at diametrically opposite positions thereof to provide a pair of flat surfaces extending in parallel with inner surfaces of opposite side walls of the through-hole, and a pair of aligned holes in confrontation with the head portion are formed on the opposite side wails and allow the head portion to rotate about the neck portion in the socket.

The fastening member may be a hook or one of a male member and a female member of a buckle.

The present invention further seeks to provide a method of producing the molded synthetic resin belt connecting device of the type described above. The method comprises the steps of: providing a mold assembly which is composed of a pair of opposed, relatively movable main molds having respective mold surfaces jointly defining a mold cavity for molding the belt attachment member, the fastening member and the socket of the swivel joint, a pair of opposed first; auxiliary molds assembled in the main molds, respectively, from a first direction for molding opposite end portions of the shaft and a pair of aligned bearing holes in the belt attachment member such that the opposite ends of the shaft are loosely received in the corresponding bearing holes, a pair of opposed second auxiliary molds assembled in the main molds, respectively, from the first direction for molding the neck portion of the headed pin such that the neck portion is loosely received in the socket, and a pair of opposed third auxiliary molds assembled in the main molds, respectively, from a second direction preferably perpendicular to the first direction for molding the head portion of the headed pin such that the head portion is loosely received in the socket. While keeping the mold assembly in a closed condition, a molten synthetic resin material will be injected into the cavity in the mold assembly, thereby forming the belt attachment member and the fastening member molded in an assembled condition by a single injection-molding run, with the headed pin freely rotatably received in the socket.

Preferably, the pair of opposed first auxiliary molds are integral with the main molds.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Certain preferred embodiments of the present invention will be described below in greater detail with reference to the accompanying drawings.

Figure 1:
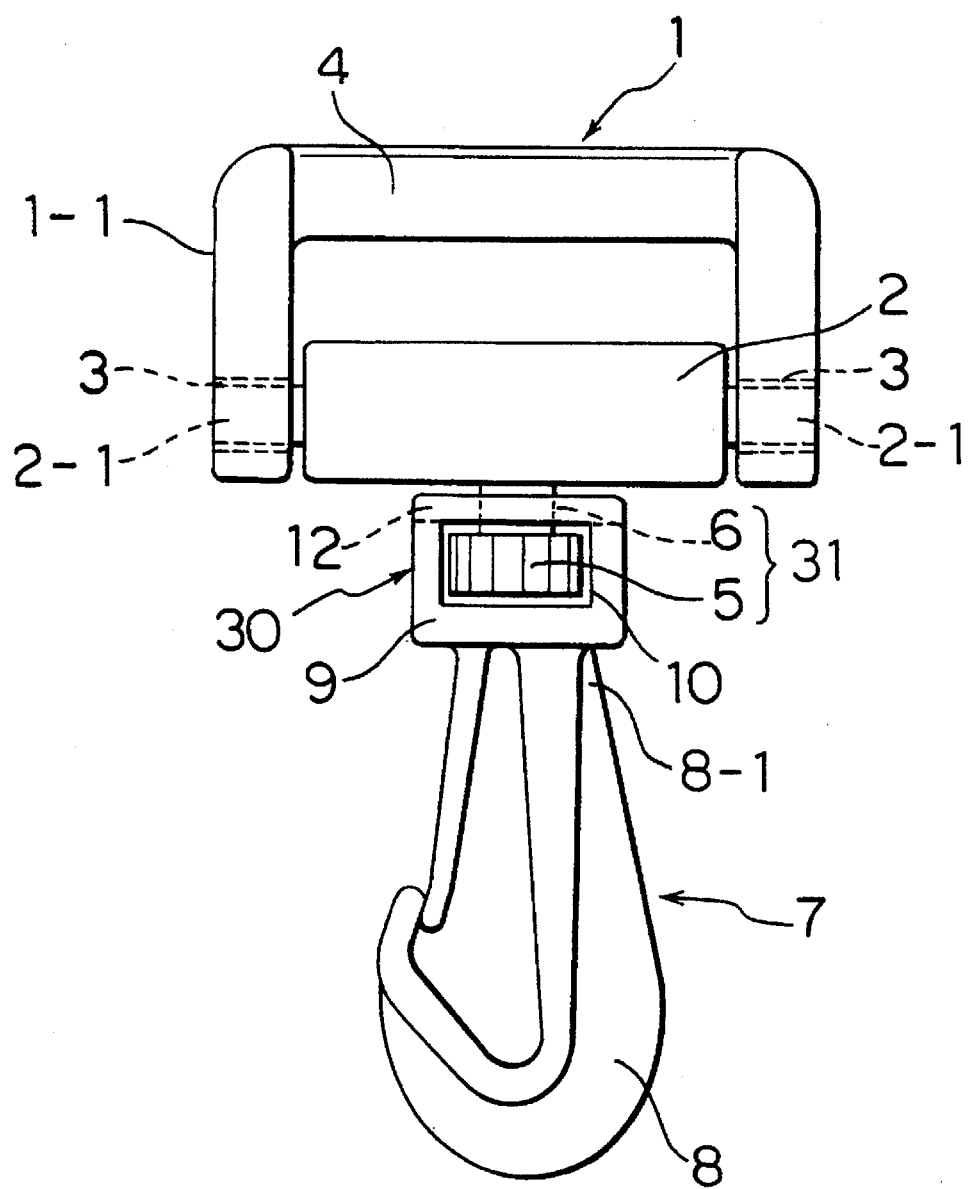
FIG. 1 is a plan view of a molded synthetic resin belt connecting device according to an embodiment of the present invention.
Figure 2:
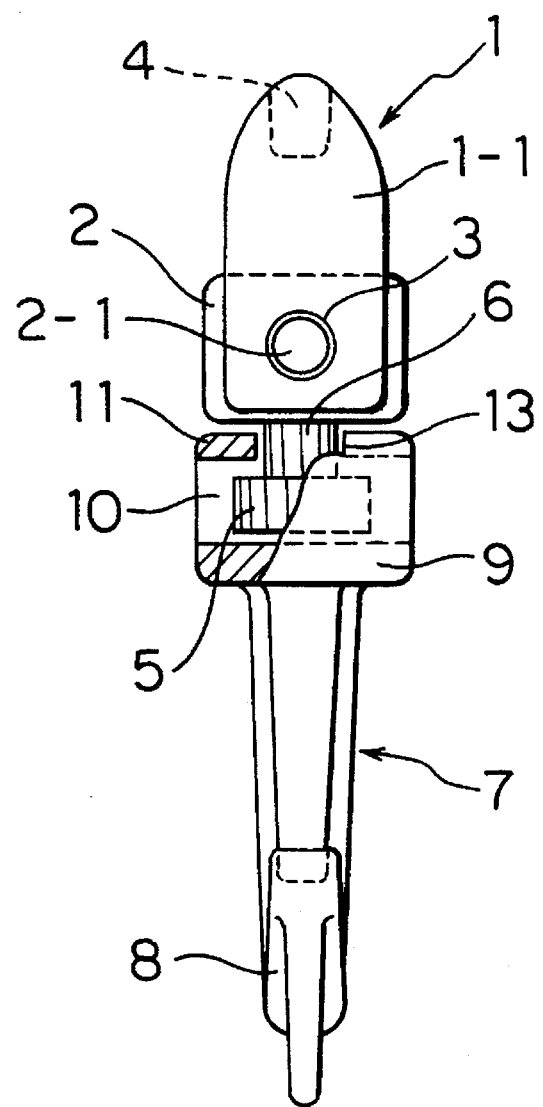
FIG. 2 is a side view of FIG. 2 with parts broken away for clarity.

FIGS. 1 and 2 show a molded synthetic resin belt connecting device according to an embodiment of the present invention. The molded synthetic resin belt connecting device is produced by a single run or cycle of the injection molding process using a reinforced plastic of the class called as "engineering plastics" such as nylon, polyacetal, polycarbonate and the like, and is composed of a belt attachment member 1 and a fastening member 7 rotatably connected with each other via a swivel joint 30.

The belt attachment member 1, as shown in FIG. 1, includes a generally U-shaped frame 1-1, and a shaft 2 rotatably supported by the U-shaped frame 1-1 transversely across an opening of the U-shaped frame 1-1, with opposite end portions 2-1, 2-1 rotatably received in a pair of aligned bearing holes 3, 3 in the U-shaped frame 1-1. The U-shaped frame 1-1 includes a belt attaching portion or bar 4 parallel spaced apart from the shaft 2 and adapted to be connected to a looped end of a belt or strap attached to a bag, a knapsack or the like. The rotatably supported shaft 2 has a central portion with which a headed pin 31 of the swivel joint 30 is integrally formed. The headed pin 31 is solid and free from a slit, and it has a reduced neck portion 6 integral with the central portion of the rotatable shall 2, and an enlarged circular cylindrical head portion 5 having a diameter greater than that of the neck portion 6.

Figure 3:
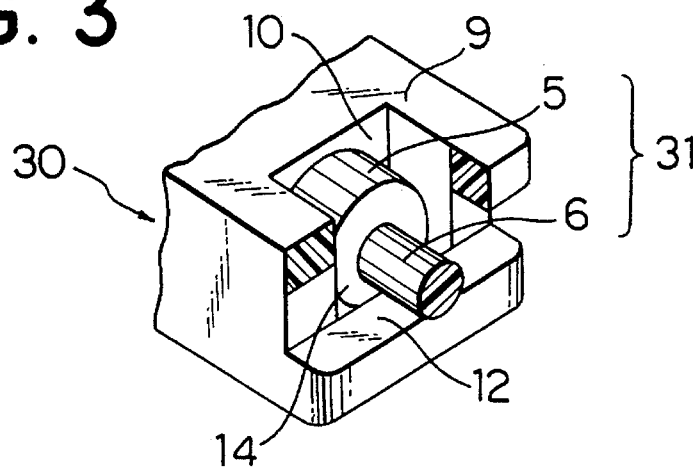
FIG. 3 is an enlarged perspective view showing a swivel joint of the belt connecting device composed of a headed pin and a socket rotatably receiving therein the headed pin.

The fastening member 7, as shown in FIG. 1, is composed of a hook 8 adapted to catch or hook an end of another belt or strap. The hook 8 has a base portion 8-1 with which a socket 9 of the swivel joint 30 is integrally formed, and the headed pin 31 of the swivel joint 30 is rotatably received in the socket 9. The socket 9 has a generally rectangular box-like shape having a through-hole 10 extending centrally through the rectangular box-like socket 9 and loosely receiving therein the head portion 5 of the headed pin 31, as shown in FIG. 2. The socket 9 has a top wall 11, and a cutout groove 12 extending across the top wall 11 in a direction perpendicular to the direction of the through-hole 10, as shown in FIG. 2. The through-hole 10 and the cutout groove 12 intersect with each other and hence communicate with each other via a central rectangular opening 13 (FIG. 2) in which the neck portion 6 of the headed pin 31 is loosely and rotatably received. As shown in FIG. 3, the head portion 5 which is larger in diameter than the neck portion 6 bas an end face 14 engageable with an inner surface of the grooved top wall 11 so that the head portion 5 is prevented from displacing off the socket 9. With this construction, since the fastening member 7 is connected with the rotatable shaft 2 of the belt attachment member 1 via the swivel joint 30, the hook 8 is rotatable freely about an axis of the headed pin 31 and also is turnable freely about the axis of the shaft 2.

Figure 4:
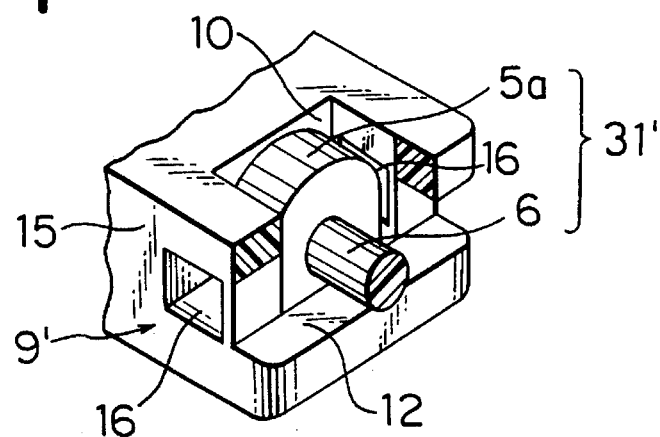
FIG. 4 is a view similar to FIG. 3, showing a modified form of the swivel joint which has holes in the sides of the socket.
Figure 5:
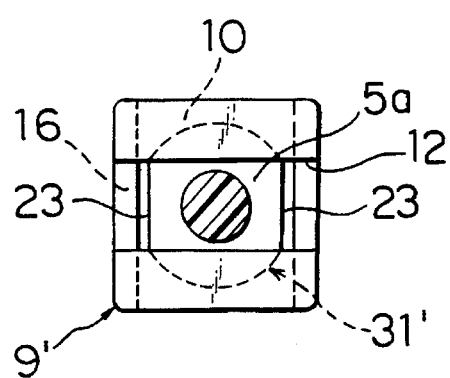
FIG. 5 is a top view showing a modified form of the headed pin of the swivel joint.

FIGS. 4 and 5 illustrate a modified form of the headed pin 31 and the socket 9 of the swivel joint 30. The modified headed pin 31' includes a head portion 5a which is cutout at diametrically opposite positions thereof to provide a pair of flat surface portions 23, 23 extending in parallel with the inner surfaces of opposite side walls 15 of the through-hole 10. With the cutout flat surface portions 23, 23 thus provided, it is possible to enlarge the maximum diameter of the head portion 5a. The ramified socket 9' includes a pair of aligned holes 16 communicating with the through-hole 10 and formed in confrontaion with the head portion 5a at respective central portions of the opposite side walls 15 of the socket 9' which are free from open ends of the through-hole 10. The aligned holes 16 formed at the opposite side wails 15 allow the head portion 5a to rotate about the neck portion 6 in the socket 9'.

Figure 6:
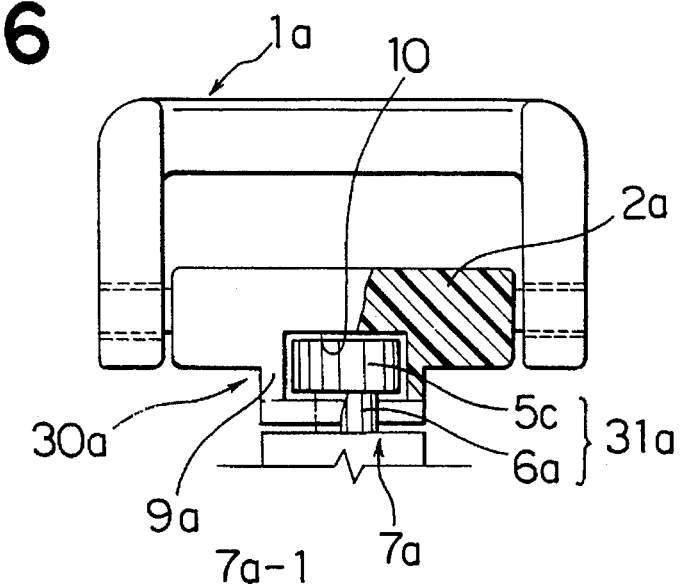
FIG. 6 is a fragmentary plan view, with parts broken away for clarity, of a modified belt connecting device including a belt attachment member having a rotatable shaft with which a socket of the swivel joint is integrally formed.
Figure 7:
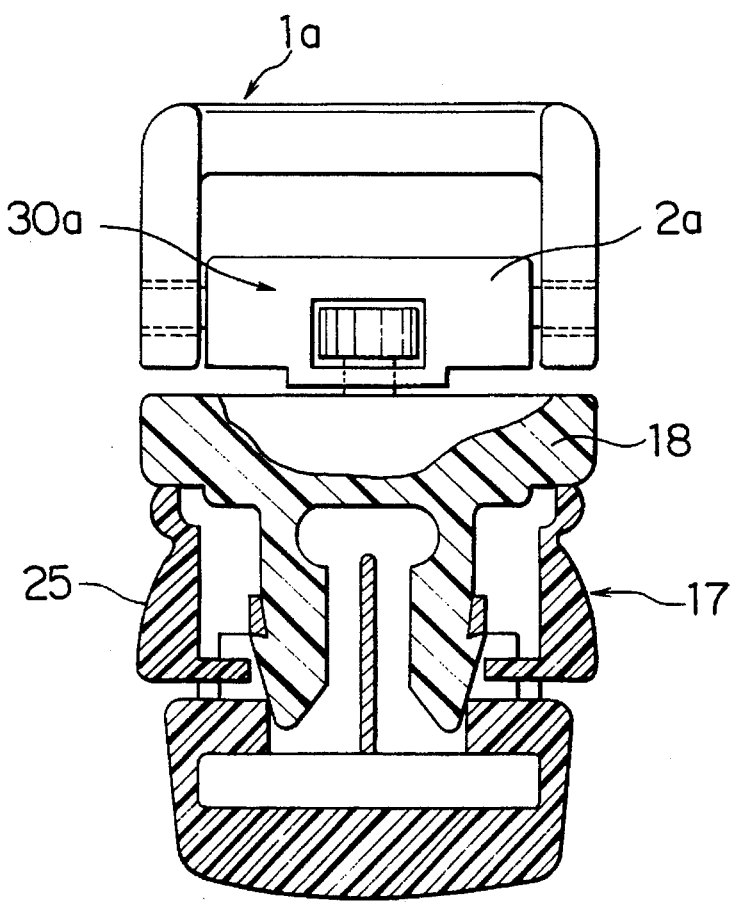
FIG. 7 is a plan view, partly in cross section, of the modified belt attachment device used as a male member of a snap-fit buckle or strap fastener.

FIGS. 6 and 7 illustrate a modified belt connecting device according to another embodiment of this invention. The modified belt connecting device includes a belt attachment member 1a having a rotatable shaft 2a, and a fastening member 7a rotatably connected with the belt attachment member 1a via a swivel joint 30a which is composed of a headed pin 31a formed integrally with a base portion 7a-1 of the fastening member 7a, and a socket 9a formed integrally with a central portion of the shaft 2a of the belt attachment member 1a. The bell attachment member 1a and the fastening member 7a are injection-molded of synthetic resin in an assembled condition in which an enlarged circular head portion 5b and a reduced neck 6a portion of the headed pin 31a are rotatably received in the socket 9a. As shown in FIG. 7, the fastening member 7a is composed of a male member 18 of a snap-fit buckle or strap fastener 17. It will be appreciable that the fastening member 7a may be a female member 25 of the strap fastener 17.

Figure 8:
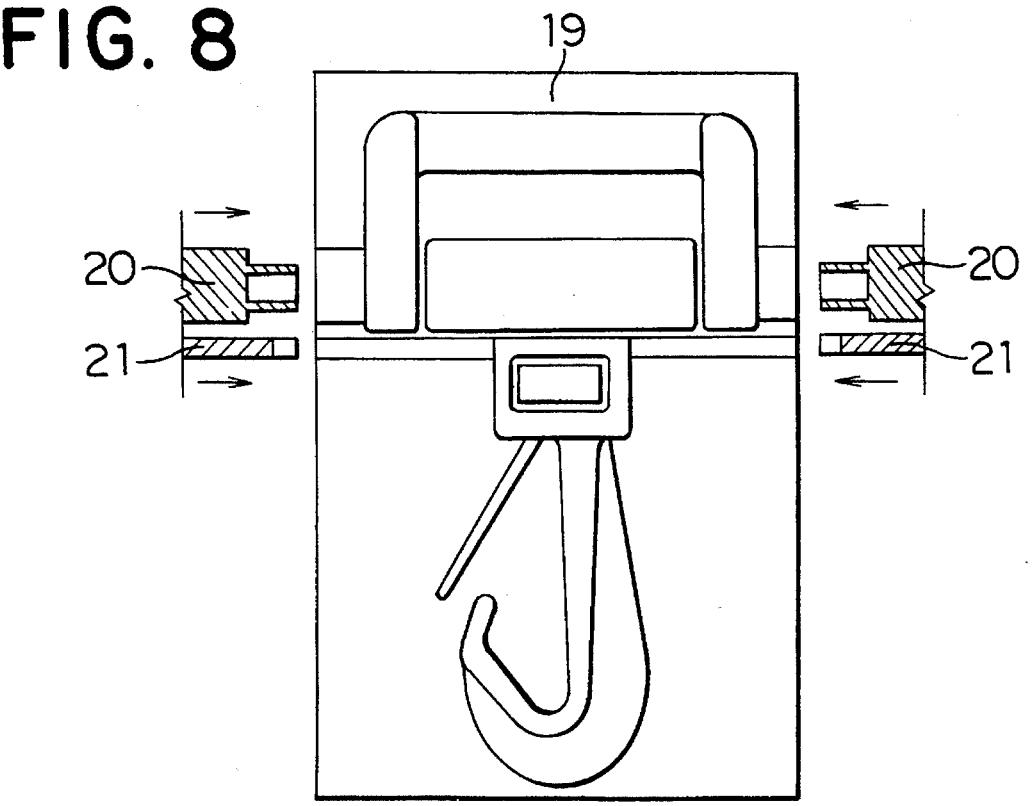
FIG. 8 is a diagrammatical plan view with parts in cross section, of a mold assembly used for injection-molding the belt connecting device shown in FIG. 1.
Figure 9:
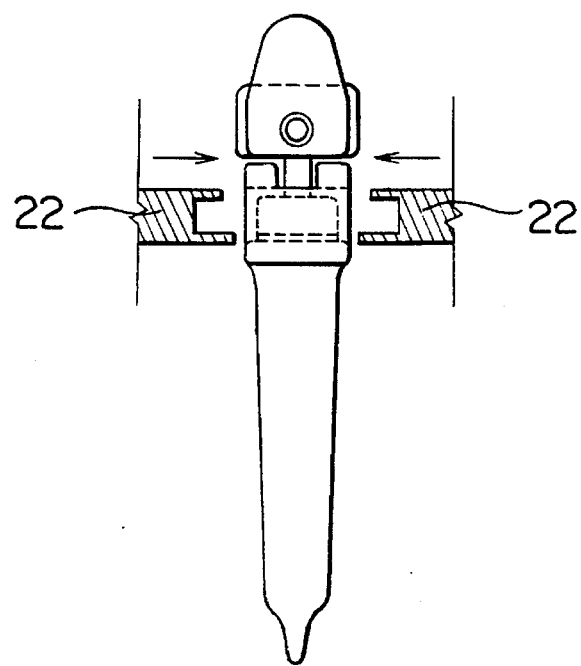
FIG. 9 is a diagrammatical view, with parts in cross section, illustrative of the manner in which a head portion of the headed pin of a swivel joint is formed by a pair of auxiliary molds.

FIGS. 8 and 9 diagrammatically illustrates a mold assembly used for injection-molding the synthetic resin belt. connecting device of this invention shown in FIGS. 1 and 2. The mold assembly is composed of a pair of opposed, relatively movable main molds 19 (only one being shown), and three auxiliary mold pairs 20, 21, 22. Using the mold assembly, the belt connecting device is molded by a single injection-molding run or cycle line main molds 19 in FIG. 8 have respective mold surfaces recessed to define a mold cavity for molding the bell attachment member 1 including a main portion or body of the shaft 2, the fastening member 7, and the socket 9 of the swivel joint 30 as shown in FIG. 1 and 2. The pair of opposed first auxiliary molds 20 are inserted in the main molds 19 from the left and right sides, respectively, of the main molds 19 as shown in FIG. 8 for simultaneously molding the opposite end portions 2-1 of the shaft 2 and the corresponding bearing holes 3 in the belt attachment member 1 such that the opposite end portions 2-1 of the shaft 2 are loosely received in the corresponding bearing holes 3 as shown in FIG. 1 and 2. Similarly, the pair of opposed second auxiliary molds 21 are inserted in the main molds 19 from the left and right sides, respectively, of the main molds 19 as shown in FIG. 8 for simultaneously molding the neck portion 6 of the headed pin 31 and the cutout groove 12 in the socket 9 such that the neck portion 6 is loosely received in the socket 9 as shown in FIG. 1 and 2. On the other hand, The pair of opposed third auxiliary molds 21 are inserted in the main molds 19 from the front and rear sides, respectively, of the main molds 19 as shown in FIG. 9 for simultaneously molding the head portion 5 of the headed pin 31 and the through-hole 10 in the socket 9 such that the head portion 5 is loosely received in the socket 9 as shown in FIG. 1 and 2.

The main molds 19 are closed together, with the first, second and third auxiliary molds 20, 21, 22 properly assembled in the main molds 19 to complete the mold assembly, and while keeping the mold assembly 19–22 in the closed condition, a molten synthetic resin material is injected from a sprue (not shown) into the mold cavity in the mold assembly whereby a molded synthetic resin belt connecting device can be produced by a single run or cycle of the injection-molding process. With this injection-molding, since the belt attachment member 1 and the fastening member 7 of the belt connecting device are molded in assembled condition via the swivel joint 30, a conventional assembling work for the belt attachment member and the fastening member can be omitted. The third auxiliary molds 22 for molding the head portion 5 may be provided integrally with the corresponding main molds 19 instead of being assembled in the main molds 19.

It is apparent from the foregoing description that since the swivel joint can be formed by a single injection molding run or cycle in an assembled condition in which the headed pin is loosely and rotatably received in the socket, a separate work or process for assembling the belt attachment member and the fastening member can be omitted. The beaded pin is by no means required to have a particular arrangement, such as a split radially contractible construction, so the assembling between the belt attachment member and the fastening member will be facilitated. Thus, the joint portion between the belt attachment member and the fastening member is very strong in construction with the result that the belt connecting device is excellent in durability.

The same advantageous effects can be attained when the headed pin of the swivel joint is formed integrally with the fastening member and the socket of the swivel joint is formed integrally with the belt attachment member. It is, therefore, possible to select the combination of the headed pin and the socket with the belt attachment member and the fastening member in an adequate manner according to the form and structure of the belt attachment member and the fastening member.

By using the auxiliary molds which are assembled in the main molds for molding the opposite end portions of the shaft of the belt attachment member, the neck portion of the headed pin and the head portion of the headed pin, the belt connecting device can be produced by a single injection-molding run or cycle such that the belt attachment member and the fastening member are rotatably connected together. With this molding method of the present invention, a work for assembling the belt attachment member and the fastening member can be omitted, thus making it possible to abridge labor and improve the production efficiency.

Obviously, various minor changes and modifications of the present invention are possible in the light of the above teaching. It is therefore to be understood that within the scope of the appended claims the invention may be practiced otherwise than as specifically described.

What is claimed is:

1. A molded synthetic resin belt connecting device comprising:

a belt attachment member; and a fastening member rotatably connected with said belt attachment member via a swivel joint, said swivel joint including a headed pin formed integrally with one of said belt attachment member and said fastening member, having a neck portion connected to a head portion, said head portion having a flat surface on a side of said head portion toward said neck portion and surrounding said neck portion, and a socket formed integrally with the other of said belt attachment member and said fastening member and rotatable freely on said headed pin, said socket providing a cavity for containing said head portion beneath a top wall, said top wall defining a slot having a width smaller than a width of said flat surface such that said flat surface confronts a flat face of said top wall to prevent withdrawal of said head portion from said cavity wherein said belt attachment member and said fastening member are molded of synthetic resin in an assembled condition, with said headed pin freely rotatably received in said socket.

2. A molded synthetic resin belt connecting device according to claim 1, wherein said belt attachment member includes a rotatable shaft, said headed pin is integral with a central portion of said rotatable shaft and extending at right angles to a longitudinal axis of said rotatable shaft, said fastener member includes a base portion, and said socket is integral with said base portion of said fastening member.

3. A molded synthetic resin belt connecting device according to claim 1, wherein said belt attachment member includes a rotatable shaft, said socket is integral with a central portion of said rotatable shaft, said fastener member includes a base portion, and said headed pin is integral with said base portion of said fastening member and extending at right angles to a longitudinal axis of said rotatable shaft.

4. A molded synthetic resin belt connecting device according to claim 1, wherein said neck portion is integral with said one of said belt attachment member and said fastening member, and said head portion has a diameter larger than that of said neck portion, and said cavity is defined by a through-hole extending in a first direction and loosely receiving therein said head portion, and said slot is defined by a cutout groove loosely receiving said neck portion and extending in a second direction which is different from said first direction and intersects the through-hole.

5. A molded synthetic resin belt connecting device according to claim 4, wherein said first and second directions are perpendicular to one another.

6. A molded synthetic resin belt connecting device according to claim 1, wherein said fastening member is a hook.

7. A molded synthetic resin belt connecting device according to claim 1, wherein said fastening member is one.

8. A molded synthetic resin belt connecting device comprising:

a belt attachment member; and a fastening member rotatably connected with said belt attachment member via a swivel joint, said swivel joint including a headed pin formed integrally with one of said belt attachment member and said fastening member, and a socket formed integrally with the other of said belt attachment member and said fastening member and rotatable freely on said headed pin, wherein said belt attachment member and said fastening member are molded of synthetic resin in an assembled condition, with said headed pin freely rotatably received in said socket;

wherein said headed pin includes a neck portion integral with said one of said belt attachment member and said fastening member, and a head portion having a diameter larger than that of said neck portion, and said socket has a through-hole extending in a first direction and loosely receiving therein said head portion, and a cutout groove loosely receiving said neck portion and extending in a second direction which is different from said first direction and intersects the through-hole; and wherein said head portion is cutout at diametrically opposite positions thereof to provide a pair of flat surfaces extending in parallel with inner surfaces of opposite side walls of said through-hole, and said opposite side walls have a pair of aligned holes thereon in confrontation with said head portion.

9. A molded synthetic resin belt connecting device comprising:

a belt attachment member; and a fastening member rotatably connected with said belt attachment member via a swivel joint, said swivel joint including a headed pin formed integrally with one of said belt attachment member and said fastening member, having a neck portion connected to a head portion, said head portion having a flat surface on a side of said head portion toward said neck portion and surrounding said neck portion, and a socket formed integrally with the other of said belt attachment member and said fastening member and rotatable freely on said headed pin, said socket providing a cavity beneath a top wall, said top wall defining a slot having a width smaller than a width of said flat surface such that said flat surface confronts said top wall to prevent withdrawal of said head portion from said socket, wherein said head portion is shaped as a substantial portion of a right circular cylinder with a second flat side opposite said flat surface;

wherein said belt attachment member and said fastening member are molded of synthetic resin in an assembled condition, with said headed pin freely rotatably received in said socket said socket restricts rotation of said headed pin to rotation about an axis of said neck portion.

10. A molded synthetic resin belt according to claim 9, wherein said head portion is molded to have two parallel flat sides.

11. A molded synthetic resin belt connecting device according to claim 10, wherein said cavity is defined by a through-hole extending through said socket and receiving said head portion, side walls of said through-hole being arranged in parallel and spaced apart a distance greater than a distance between said flat surfaces of said head portion.

* * * * *